United States Patent [19]

Augustin et al.

[11] Patent Number: 4,514,235

[45] Date of Patent: Apr. 30, 1985

[54] FROG, IN PARTICULAR FROG POINT, FOR RAIL CROSSING OR RAIL SWITCHES AS WELL AS PROCESS FOR PRODUCING SAME

[75] Inventors: Hubert Augustin, Leoben; Robert Pirker, Zeltweg, both of Austria

[73] Assignee: Voest-Alpine Aktiengesellschaft, Vienna, Austria

[21] Appl. No.: 531,399

[22] Filed: Sep. 12, 1983

[30] Foreign Application Priority Data

Sep. 15, 1982 [AT] Austria ................................ 3457/82

[51] Int. Cl.³ .............................................. C22C 38/08
[52] U.S. Cl. ..................... 148/37; 75/128 B; 75/128 T; 75/123 K; 246/471; 428/682; 428/683
[58] Field of Search ............... 246/471, 468, 469, 458, 246/470, 472; 238/148, 150; 75/123 K, 128 B, 128 T, 123 M, 124 C, 124 F; 148/37, 36; 428/638, 682, 683, 684, 685

[56] References Cited

U.S. PATENT DOCUMENTS 3,488,186 1/1970 Decker et al. ..................... 75/128 B
4,342,593 8/1982 Larson et al. ....................... 246/468

Primary Examiner—L. Dewayne Rutledge
Assistant Examiner—Debbie Yee
Attorney, Agent, or Firm—Cushman, Darby & Cushman

[57] ABSTRACT

In a steel frog for rail crossings and rail switches, the frog point or, respectively, the surface of the frog being travelled upon by the wheels consists of an age-hardening steel having the composition

| C 0.01 to 0.05% | Ti 0.1 to 1% |
| Si 0.01 to 0.2% | Cr 0 to 13% |
| Mn 0.01 to 0.2% | Al 0 to 0.2% |
| Co 0 to 15% | B 0 to 0.1% |
| Mo 1.5 to 6% | Zr 0 to 0.1% |
| Ni 7 to 20% | |

The frog is manufactured such that the surface being travelled upon by the wheels is applied by build-up welding onto a base body consisting of nominal rail steel.

3 Claims, No Drawings

FROG, IN PARTICULAR FROG POINT, FOR RAIL CROSSING OR RAIL SWITCHES AS WELL AS PROCESS FOR PRODUCING SAME

The invention refers to a frog, in particular a frog point, of steel for rail crossings or rail switches as well as to a process for producing such a frog. Frogs are subjected to high load and high wear when being travelled upon by the wheels of a rail vehicle and this particularly if the wheels roll from a wing rail onto the frog point or, respectively, from a frog point onto a wing rail. The frog point is subjected to particular high stress when a wheel rolls from the wing rail to the frog point and is unproportionally increased with increasing axle loads and, above all, with increasing traffic speed, so that considerable deformations can occur at the frog point, which deformations substantially reduce the life time of the frogs.

For avoiding the effect of a wheel impact on the frog point there are known frogs in combination with movable wing rails and, respectively, with movable frog points. By applying the frog point onto the wing rail and, respectively, by applying the wing rail against the frog point there is provided an interrupted rolling surface. Such frogs require, however, special switching mechanisms and thus are correspondingly complicated and expensive.

It is further known to use frogs of materials showing special properties. Known materials with particularly good wear properties and high load capacity at the area of wheel transition are hard manganese steels as well as low alloy steels specially heat-treated for quality improvement. These steels must, however, be well weldable with the adjoining frog parts and, respectively, with the rail for the purpose of being used in an uninterruptedly welded track of the up-to-date railroad superstructure. Welding of the hard manganese steel and also of the heat-treated low alloy frogs with the rail materials requires, however, in view of the limited welding properties of these steels special measures which equally are very expensive. It is also known to use at the area where the wheel travels from one part onto the other a composite material, the wear-resistant component thereof being applied at said area by building-up welding.

With all these embodiments of frogs there are used at the area where the wheel travels from one part onto the other, i.e. at the wing rail and at the frog point, either same materials or different materials with only minor differences in strength. It has surprisingly been found that when using exclusively for the frog point a material of highest strength and thus of highest wear resistance, the wing rail can also within the area where the wheel travels from one part to the other remain in normal condition (in the condition as rolled).

According to the invention it is now proposed to make the frog point and, respectively, the surface of the frog being travelled upon by the wheels of an age-hardening steel having the composition

| | |
|---|---|
| C 0.01 to 0.05% | Ti 0.1 to 1% |
| Si 0.01 to 0.2% | Cr 0 to 13% |
| Mn 0.01 to 0.2% | Al 0 to 0.2% |
| Co 0 to 15% | B 0 to 0.1% |
| Mo 1.5 to 6% | Zr 0 to 0.1% |
| Ni 7 to 20% | |

When using such a steel, the whole frog point can consist of such a steel, noting that manufacturing of the frog point can be effected from a piece of such a steel by cutting operation or by material detaching work. In this manner it is possible to manufacture in an economic manner frogs which meet the highest load requirements. The steel type used according to the invention for the frog point has up till now not been used in railroad superstructure and is included within the group of martensite-hardening steels. The steel is well weldable and well workable after a solution treatment. Such types of steels are characterized by the property of assuming a very high hardness accompanied by a good tenacity on account of martensite conversion and/or precipitation of intermetallic phases when being aged at 200° to 600° C. The obtainable strength amounts to approximately 1800 to 2200N/mm$^2$.

In a preferred manner, the inventive frog and, respectively, frog point is made by producing the running surface for the wheel by build-up welding onto a base body consisting of nominal rail steel. Build-up welding can be effected to obtain a thickness of approximately 15 mm.

What is claimed is:

1. A frog for rail crossings or rail switches wherein said frog having a surface, for wheels to travel upon, characterized in that the frog or the surface of the frog is made of an age-hardened steel consisting essentially of

| | |
|---|---|
| C 0.01 to 0.05% | Ti 0.1 to 1% |
| Si 0.01 to 0.2% | Cr 0 to 13% |
| Mn 0.01 to 0.2% | Al 0 to 0.2% |
| Co 0 to 15% | B 0 to 0.1% |
| Mo 1.5 to 6% | Zr 0 to 0.1% |
| Ni 7 to 20% | | and the balance of iron.

2. Frog as in claim 1 including a base body of nominal rail steel, said surface for wheels to travel upon, being a welded build-up on said base.

3. Frog as in claim 2 wherein the welded build-up has a thickness of approximately 15 mm.

* * * * *